No. 728,623.

Patented May 19, 1903.

UNITED STATES PATENT OFFICE.

ALBRECHT SCHMIDT AND FRITZ BETHMANN, OF HÖCHST-ON-THE-MAIN, GERMANY, ASSIGNORS TO FARBWERKE, VORM. MEISTER, LUCIUS & BRÜNING, OF HÖCHST-ON-THE-MAIN, GERMANY, A CORPORATION OF GERMANY.

BLUE SULFUR DYE AND PROCESS OF MAKING SAME.

SPECIFICATION forming part of Letters Patent No. 728,623, dated May 19, 1903.

Application filed March 3, 1903. Serial No. 146,002. (No specimens.)

*To all whom it may concern:*

Be it known that we, ALBRECHT SCHMIDT, Ph. D., and FRITZ BETHMANN, Ph. D., citizens of the Empire of Germany, residing at Höchst-on-the-Main, Germany, have invented certain new and useful Improvements in the Manufacture of Sulfurized Dyestuffs, of which the following is a specification.

We have found that such diphenylamin bodies as are derived from dialkyl-para-phenylenediamin, on the one hand, and ortho-ortho-dichlorphenol, on the other hand, having the constitution:

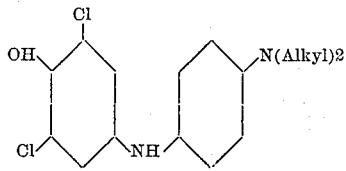

yield blue sulfurized dyestuffs when heated with sulfur—as, for instance, with sodium sulfid and sulfur—at and above about 95° centigrade, which no longer contain chlorin. The parent materials which have not hitherto been described are obtained, for instance, by oxidizing dialkyl-para-phenylenediamin and ortho-ortho-dichlorphenol and reducing the dichlorinated indophenol thus obtained. They may also be obtained by reducing the indophenols derived from the oxidation of ortho-ortho-dichlor-para-amidophenol and dialkyl-anilins also by heating dichlor-para-amidophenol with dialkyl-para-phenylenediamin hydrochlorids. We have further found that the manufacture of ortho-ortho-dichlorphenol may be combined with that of indophenol in a single operation by dissolving phenol in alkali and allowing to run into it the quantity of chlorid of lime or a solution of sodium hypochlorite calculated for ortho-ortho-dichlorphenol, then after the reaction adding the calculated quantity of a dimethyl-para-phenylenediamin solution and oxidizing the mixture with a hypochlorite, potassium ferricyanid, or another oxidizing agent to indophenol. This is then isolated and reduced with sodium sulfid to the leuco compound. The tedious and expensive isolation of dichlorphenol is thus avoided. It is preferable to use an excess of dichlorphenol solution.

Example I: The dimethyl-para-amido-$p_1$-oxy-$meta_1$-$meta_1$-dichlordiphenylamin may be obtained as follows: A solution of dimethyl-para-phenylenediamin in about fifteen thousand parts of water, obtained by reducing with iron and zinc dust one hundred and fifty parts, by weight, of nitrosodimethylanilin, is mixed with a solution of one hundred and eighty parts of ortho-ortho-dichlorphenol in one hundred and fifteen parts of caustic-soda lye and twelve thousand parts of water, and there is run in at about 0° to 4° centigrade a solution of thirteen hundred and eighteen parts of potassium ferricyanid, two hundred and twelve parts of sodium carbonate, and four thousand five hundred parts of water. The separated dichlorindophenol is dissolved after filtration in sodium sulfid and the filtered sodium-sulfid solution is precipitated with bicarbonate. The dimethyl-para-amido-$para_1$-oxy-$meta_1$-$meta_1$-dichlordiphenylamin separates entirely or partly as small white crystals. They readily oxidize when exposed to the air, becoming green crystals of the corresponding indophenol. Instead of ferricyanid also hypochlorites may be used when oxidizing.

To manufacture the sulfurized dyestuff, the process is as follows: Sixty parts of dimethyl-para-amido-$para_1$-oxy-$meta_1$-$meta_1$-dichlordiphenylamin (about eighty-two parts of moisture) are heated in a reflux apparatus with two hundred parts of sodium sulfid, sixty parts of glycerin, eighty-four parts of sulfur, and twenty parts of water, preferably in the presence of some alcohol. The limit of inside temperature is about 94° centigrade. Soon there is a rapid elimination of hydrogen sulfid and separation of the product. After about twenty hours the mixture is diluted with water, when the product separates completely. The latter is filtered and washed. The dyestuff needs no further purification. It is diluted only with sulfur, but dyes even in the raw unpurified state a reddish blue of very clear indigo-like shade. The dyestuff freed from sulfur by redissolving in the usual manner is a violet-black powder insoluble in water, which on rubbing assumes a metallic luster. Concentrated sulfuric acid dissolves it to a blue solution, also alcohol, but only in slight degree. Sulfids of alkali metals dissolve it easily when hot. By treating the dyestuff with oxidizing agents, and even when isolating, the dyestuff becomes of a somewhat bluer or more violet shade.

For dimethyl-para-amido-para$_1$-oxy-meta$_1$-meta$_1$-dichlorphenylamin, though less advantageous, may be substituted the corresponding indophenol. The corresponding diethyl-amido compounds behave in a similar manner.

Example II: Ninety-eight parts of phenol are dissolved in one hundred and eighteen parts of concentrated caustic-soda lye and two thousand parts of water. Into this solution is run the calculated quantity of chlorid-of-lime solution, (one molecular proportion of chlorid of lime for one molecular proportion of phenol.) After the chlorination the solution, containing chiefly dichlorphenol, is separated by filtration with or without previous precipitation of the dissolved lime with sodium carbonate, &c. The alkaline solution is then mixed with the dimethyl-para-phenylenediamin solution obtained from one hundred and fifty parts of nitroso-dimethyl-anilin, after having previously neutralized the greater part of the caustic alkali formed, and this in such a manner that the dichlorphenol remains still dissolved in the alkaline solution. Then is run in, while stirring and cooling at about 10° centigrade, potassium ferricyanid or another oxidizing agent, such as a solution of sodium hypochlorite, until the oxidation is complete. The dichlorindophenol is allowed to deposit, filtered, and reduced by heating with a solution of sodium sulfid to dimethyl-para-amido-para$_1$-oxy-meta$_1$-meta$_1$-dichlordiphenylamin. The indophenol thus obtained may also directly be introduced into the sodium sulfid mass.

Having now described our invention, what we claim is—

1. The herein-described process for the manufacture of blue sulfurized dyestuffs, which consists in heating dialkyl-para-amido-para$_1$-oxy-meta$_1$-meta$_1$-dichlordiphenylamin with sulfur and sodium sulfid substantially as set forth.

2. The herein-described process for the manufacture of blue sulfurized dyestuffs, which consists in heating dialkyl-para-amido-para$_1$-oxy-meta$_1$-meta$_1$-dichlordiphenylamin with sulfur and sodium sulfid in the presence of a solvent, substantially as set forth.

3. As new products blue sulfurized dyestuffs being blue-black powders readily soluble in warm sodium sulfid and dyeing unmordanted cotton blue in a sulfur-alkaline bath.

In testimony that we claim the foregoing as our invention we have signed our names in presence of two subscribing witnesses.

ALBRECHT SCHMIDT.
FRITZ BETHMANN.

Witnesses:
ALFRED BRISBOIS,
BERNHARD LEYDECKER.